Patented Apr. 13, 1937

2,076,953

UNITED STATES PATENT OFFICE

2,076,953

MANUFACTURE OF HYDROCYANIC ACID

Burritt S. Lacy, Niagara Falls, N. Y., assignor to The E. I. du Pont de Nemours & Co., Wilmington, Del., a corporation of Delaware No Drawing. Application December 7, 1933, Serial No. 701,361

9 Claims. (Cl. 23—151)

This invention relates to the production of hydrocyanic acid by reaction between hydrocarbons and nitrogenous materials, and more particularly to the production of hydrocyanic acid by the reaction between nitric oxide and hydrocarbons.

It has long been known that nitric oxide may be reacted with hydrocarbon to produce hydrocyanic acid; this was reported by Kuhlmann in 1841 (Liebig's Annalen, vol. 29, page 286). Kuhlmann passed a mixture of ethylene and nitric oxide over a heated platinum sponge and found ammonium cyanide, water, carbon dioxide and nitrogen in his reaction product. His experiment was merely qualitative; he did not determine yields, nor did he show how to carry out the reaction so as to obtain yields of hydrocyanic acid suitable for commercial production. No commercial application of this reaction resulted from Kuhlmann's work and until comparatively recently no attempt has been made to utilize this reaction for the large scale production of hydrocyanic acid.

More recently the reaction between nitric oxide and hydrocarbon was investigated by Elöd and Nedelmann (Zeitschrift fur Elektrochemie, vol. 33, page 217, 1927). In the presence of a catalyst consisting of a mixture of silica and alumina, these authors were able to obtain fairly good yields of hydrocyanic acid by reacting nitric oxide with ethylene at temperatures around 1100° C. However the good yields of hydrocyanic acid were almost invariably accompanied with more or less deposition of free carbon upon the catalyst. Such carbon deposition is not a serious matter when the reaction is carried out for only a relatively short time, e. g. a few hours, but if the reaction is continued for an extended period of time, the precipitated carbon eventually fouls the reaction apparatus and may inhibit the activity of the catalyst, necessitating removal of the carbon and/or replacement of the catalyst.

Elöd and Nedelmann found that the addition of hydrogen to their reaction mixture favored the formation of hydrocyanic acid but that the presence of water in the reaction mixture substantially decreased the hydrocyanic acid yield. Therefore in order to obtain good yields, they state that the reaction mixture must be substantially free from water vapor.

An object of this invention is to provide an improved and efficient process for producing hydrocyanic acid by the catalytic reaction between nitric oxide and hydrocarbon. A further object is to prevent the formation of carbon in the aforesaid catalytic reaction. Other objects will be hereinafter apparent.

The above objects may be obtained in accordance with my invention by passing a mixture of hydrocarbon, nitric oxide, and one or more of the following gases: nitrogen, carbon dioxide and water vapor, with or without the addition of oxygen, over a catalyst containing one or more metals of the platinum group, i. e. platinum, rhodium, palladium, osmium, ruthenium and iridium at a suitable reaction temperature. Preferably, I employ a platinum or platinum alloy catalyst.

I have discovered that the formation of carbon and carbon deposition on the catalyst can be prevented in the catalytic reaction between nitric oxide and hydrocarbon by having present in the original reaction mixture substantial quantities of one or more of certain gases hereinafter termed "auxiliary gases". Such gases are of two types: (a) gases which are substantially chemically inert to the components of the reaction mixture and of the reaction products under the reaction conditions and (b) gases which are capable of reacting with carbon at the reaction temperature. The gases which I have found suitable for this purpose are nitrogen, carbon dioxide, oxygen and water vapor. I have found that the addition of these gases to the reaction mixture in considerable quantities substantially prevents carbon formation and has no appreciable adverse effect upon the yield of hydrocyanic acid produced. More specifically, I have found that water vapor may be added to the reaction mixture in substantial amounts, for example, as much as 1 to 2 volumes of water vapor to each volume of nitric oxide reacted, without decreasing the yield of hydrocyanic acid. Furthermore, I have found that in my herein described process, the presence of water vapor is advantageous. The lack of adverse action by the water vapor possibly is due to the type of catalyst employed in my process. As a result of my discovery that water vapor does not adversely affect the reaction between nitric oxide and hydrocarbon, I am able to use directly gas mixtures containing nitric oxide and water vapor for this reaction which heretofore have not been suitable for the production of hydrocyanic acid by this reaction; for example a gas obtained by oxidizing ammonia. Nitric oxide or gases containing it, suitable for carrying out my invention may be obtained from various other known sources, for example by the electric arc oxidation of nitrogen or by decomposition of a nitrite.

I have further discovered that in the reaction between nitric oxide and hydrocarbon a platinum alloy catalyst results in better conversion of the nitric oxide to hydrocyanic acid than is secured with a catalyst made of platinum with no other metal present. As catalysts, I prefer to use alloys of platinum with rhodium or palladium, containing in the neighborhood of 90% of platinum. The platinum or platinum alloy catalyst may be used in the massive form, e. g. in the form of a wire net or screen or other convenient metal surfaces; I prefer to use it in the form of a supported catalyst, that is, supported on a heat resistant, non-metallic material such as asbestos, silica, alumina or the like. I prefer to use the supported form of catalyst, since I have found that the massive form sometimes deteriorates probably because of recrystallization caused by carbonaceous gases present during the reaction.

In one method of practicing my invention, a mixture of 1 volume of nitric oxide and 1 to 2 volumes of a hydrocarbon gas or vapor is heated to 400° C. to 600° C. and passed over a supported platinum-rhodium catalyst which contains about 10% of rhodium. The reaction is exothermic and the reaction temperature will vary between 800° C. and 1400° C., depending upon the temperature to which the reaction mixture was preheated, the proportions of nitric oxide and hydrocarbon in the reaction mixture, and other factors such as rate of gas flow and heat loss from the apparatus. Preferably, I react this mixture at 1200° C. to 1400° C. The off-gas from this reaction should cool as rapidly as possible to at least 600° C., in order to prevent thermal decomposition of the reaction products. After the gas has been cooled to around 600° C., little or no thermal decomposition will occur. This method produces good yields of hydrocyanic acid although there is a tendency for a small amount of carbon to deposit in the reaction chamber.

To prevent carbon formation in the above reaction I add to the reaction mixture a gas which will not substantially affect the reaction between the nitric oxide and the hydrocarbon. A further purpose of the addition of the auxiliary gases is to increase the total heat capacity of the mixture, and thus to restrict the temperature rise produced by the heat of reaction to the most favorable range. For example, a reaction mixture containing only nitric oxide and methane in the proportions corresponding to a reaction such as

$$NO+CH_4=HCN+H_2O+\tfrac{1}{2}H_2$$

under strictly adiabatic conditions would rise in temperature by about 1300° C. so that an initial temperature of 500° C. would result in the prohibitively high final temperature of 1800° C. If, however, for each volume of NO for example, 5 volumes of diluent gas such as $N_2$, is added to the reaction mixture, the heat capacity is correspondingly increased and the adiabatic temperature rise will be only about 500° C., bringing the final temperature to about 1000° C.

As auxiliary gas, I prefer to use nitrogen, carbon dioxide, water vapor, or a mixture of two or more of these gases with or without oxygen. The presence of considerable amounts of carbon monoxide and/or hydrogen is also permissible. If oxygen is used, mixed with one or more of the other gases, a larger proportion of hydrocarbon will be required in the reaction mixture to result in a given yield of hydrocyanic acid, because part of the hydrocarbon reacts with the oxygen or a part of the oxygen. The oxygen not only removes or prevents the formation of carbon but also, because of its reaction with the hydrocarbon, increases the overall heat of reaction. Also, the greater the amount of oxygen added, the lower is the required initial temperature to produce a given yield of hydrocyanic acid, assuming that as the oxygen content is increased, the hydrocarbon content of the reaction mixture is correspondingly increased. The water vapor appears to act for the most part as an inert gas; it also appears to moderate the temperature of the reaction by endothermic hydrolysis of part of the hydrocarbon to form carbon monoxide and hydrogen. It also appears to aid in preventing the deposition of carbon in the reaction zone.

Since I have found that the presence of relatively large amounts of water vapor in the reaction mixture has substantially no adverse effect upon the reaction between nitric oxide and hydrocarbon to produce hydrocyanic acid, the gaseous mixture obtained by oxidizing ammonia to form nitric oxide and water may most advantageously be used directly as the raw material for this reaction in place of pure nitric oxide. To utilize this source of nitric oxide, I carry out the process in two stages; in the first stage, ammonia is catalytically oxidized with air to produce a hot mixture consisting chiefly of nitric oxide, water vapor, oxygen and nitrogen and in the second stage, a suitable quantity of hydrocarbon gas or vapor is added and the resulting gaseous mixture is passed over a suitable reaction catalyst, e. g. platinum or platinum alloy.

In one method of practicing my invention by this two-stage process, in the first stage 1 volume of ammonia is reacted with 8 to 10 volumes of air in the presence of a suitable ammonia oxidation catalyst. As an ammonia oxidation catalyst, I prefer to use a wire screen made of a platinum-rhodium alloy containing around 10% of rhodium. However, any of the well-known ammonia oxidation catalysts may be used in this first stage, or the various known processes for oxidizing ammonia may be utilized. In accordance with the usual practice in oxidizing ammonia, the hot off-gases from the ammonia oxidation converter which ordinarily have a temperature of around 850° C. to 1000° C., may be used advantageously to preheat the ammonia and/or air entering the ammonia oxidation reaction. In any event, whether or not this heat exchange between the ammonia oxidation off-gases and the air and/or ammonia is effected, I cool the said off-gases by any suitable means and mix with them a hydrocarbon gas or vapor, the cooling being so adjusted that the resulting mixture will have a temperature of around 400° C. to 600° C. This reaction mixture may contain for each volume of nitric oxide, around 1.5 volumes of water vapor, 0.3 to 0.8 volume of oxygen, 6.4 to 8 volumes of nitrogen and 1 to 2 volumes of hydrocarbon as, for example, methane or natural gas. The reaction mixture is passed over a platinum or platinum alloy catalyst at a maximum temperature of around 1000° C. to 1100° C., which is conveniently maintained by means of the reaction heat itself. For the catalyst in this second stage I prefer to use a supported platinum-rhodium catalyst containing 1 to 2 parts by weight of rhodium to 8 to 9 parts of platinum. The various materials commonly used as supports or dispersing materials for metallic catalysts may be used, for example silica or other suitable refractory material.

The hot off-gas from the second-stage reaction is cooled as rapidly as possible to at least 600° C. after which, if desired, the cooling may take place more slowly. The reaction off-gas is finally cooled to a temperature below about 100° C. but above the dew point of the gas, so that substantially no water is condensed out, for example, to a temperature of 60° C. to 100° C. The gas then is scrubbed with a dilute solution of sulfuric acid to remove any unreacted ammonia and the scrubbed gas then is cooled to a point where water will condense out, preferably to 25° C. or lower. The condensate is removed and the resulting gas is scrubbed with cold water preferably at a temperature of 25° C. or lower, the above-mentioned condensate being added to the scrubbing water. This scrubbing operation removes substantially all of the hydrocyanic acid from the gas, leaving a mixture of nitrogen, some unreacted nitric oxide, excess hydrocarbon and varying amounts of hydrogen, carbon monoxide and carbon dioxide. The liquid coming from the water scrubber is a dilute solution of hydrocyanic acid, which may be reacted with alkali to produce cyanide; or the hydrocyanic acid may be recovered therefrom by known methods of distillation.

My invention will be further illustrated by the following examples:

*Example 1*

A mixture of 5 parts of nitric oxide and 7 parts of natural gas was reacted over a platinum-rhodium supported catalyst at a temperature of 1190° C. for a period of about 7 hours. The catalyst consisted of an alloy of 10 parts of rhodium to 90 parts of platinum supported on vitreous silica. During the reaction, about 75% of the nitric oxide was converted to hydrocyanic acid. At the end of the operating period the reaction chamber was filled with hydrogen and cooled and then opened for examination. A light coating of deposited carbon was observed on part of the wall of the reaction chamber, but no carbon deposition was visible on the catalyst.

*Example 2*

A mixture of 5 parts of nitric oxide, 7 parts of natural gas, and 40 parts of nitrogen was reacted in the presence of the catalyst of Example 1 at a temperature of 1160° C. for a period of 6 hours and 50 minutes. About 81% of the nitric oxide was converted to hydrocyanic acid. After cooling the catalyst chamber in an atmosphere of hydrogen there was no evidence of carbon deposition.

*Example 3*

An apparatus was set up whereby ammonia and air could be passed over a platinum-rhodium catalyst of wire gauze to oxidize the ammonia and the oxidation products subsequently passed through a reaction chamber containing a supported platinum-rhodium catalyst. One volume of ammonia and 10 volumes of air were passed through this apparatus. The gaseous products issuing from the ammonia oxidation catalyst were cooled to 20° C. to 25° C. to condense out water formed by the oxidation reaction. The residual gases were mixed with a stream of natural gas and the mixture then was passed over the supported platinum-rhodium catalyst of Example 1 at a temperature of about 1000° C. This operation was continued for a period of about 24 hours. The catalyst occupied a space of about 10 cubic centimeters.

In a second run, the step of condensing out water from the ammonia oxidation products was omitted. The results obtained in these two runs are tabulated below:

| Run | A | B |
|---|---|---|
| Ammonia | 500 c. c./min | 500 c. c./min. |
| Air | 5000 c. c./min | 5000 c. c./min. |
| Natural gas | 650 c. c./min | 750 c. c./min. |
| Percent of water removed from NH₃ oxidation products | 87% | None. |
| Percent yield of HCN (based on NH₃ used) | 61.7% | 61.3%. |

Substantially no carbon was deposited in the catalyst chamber or on the catalyst during either run.

*Example 4*

A mixture of 5 volumes of nitric oxide, 40 volumes of nitrogen, 3.75 volumes of oxygen and 40 volumes of natural gas were passed over the catalyst described in Example 1; the space occupied by the catalyst was about 10 c. c. 56.4% of the nitric oxide was converted to hydrocyanic acid.

*Example 5*

Mixtures of nitric oxide, oxygen, nitrogen, steam, and natural gas, containing varying amounts of steam were passed over a supported platinum-rhodium catalyst at temperatures around 1100° C. The catalyst occupied a space of about 10 cubic centimeters. The data and results obtained are tabulated below:

| Run | A | B | C |
|---|---|---|---|
| Nitric oxide | 500 c. c./min | 500 c. c./min | 500 c. c./min. |
| Oxygen | 375 c. c./min | 375 c. c./min | 375 c. c./min. |
| Nitrogen | 4,000 c. c./min | 4000 c. c./min | 1000 c. c./min. |
| Steam | 750 c. c./min | 2500 c. c./min | 3100 c. c./min. |
| Natural gas | 900 c. c./min | 1200 c. c./min | 1200 c. c./min. |
| Reaction temperature | 1,120° C | 1110° C | 1100° C. |
| Steam in reaction mixture (percent by vol.) | 11.3% | 29.2% | 50.3%. |
| Percent yield of HCN (based on NO used) | 74.0% | 72.5% | 75.0%. |

*Example 6*

A mixture of nitric oxide, nitrogen, oxygen, steam and natural gas was passed over a supported platinum-rhodium catalyst occupying a volume of 10 c. c. at about 1100° C. for a period of 5 hours until optimum conditions were established. The flow of oxygen was then cut off and the run continued with somewhat diminished flow of natural gas. The data and results obtained are given in the following table:

| Run | A | B |
|---|---|---|
| Nitric oxide | 500 c. c./min | 500 c. c./min. |
| Nitrogen | 4000 c. c./min | 4000 c. c./min. |
| Oxygen | 375 c. c./min | None. |
| Steam | 750 c. c./min | 750 c. c./min. |
| Natural gas | 800 c. c./min | 600 c. c./min. |
| Reaction temperature | 1100° C | 1300° C. |
| Percent yield of HCN (based on NO used) | 57.7% | 56.6%. |

*Example 7*

Ammonia was oxidized with air in the presence of a platinum-rhodium catalyst to produce nitric oxide and the resulting hot reaction oxidation product was mixed with a fuel gas and passed over various supported catalysts of the platinum group metals. In different runs, the supported catalysts consisted of platinum, platinum-rhodium alloy, and platinum-palladium alloy respectively. In each case, the catalyst occupied a volume of about 10 c. c. and the reaction temperature was about 1000° C. The fuel gas, made by distillation of coal, had the following approximate analysis:

| | Percent |
|---|---|
| Methane | 29.5 |
| Acetylene | 1.1 |
| Ethane and other higher hydrocarbons | 2.2 |
| Hydrogen | 52.0 |
| Nitrogen | 5.8 |
| Oxygen | 0.5 |
| Carbon monoxide | 6.8 |
| Carbon dioxide | 2.1 |

The data and results are tabulated below:

| Run | A | B | C | D |
|---|---|---|---|---|
| Catalyst—2nd stage | 100% Pt | 90% Pt—10% Rh | 90% Pt—10% Pd | 100% Rh |
| Ammonia | 500 c.c./min | 500 c.c./min | 500 c.c./min | 500 c.c./min |
| Air | 5,000 c.c./min | 5000 c.c./min | 5000 c.c./min | 5000 c.c./min |
| Fuel gas | 1,000 c.c./min | 1700 c.c./min | 1200 c.c./min | 2400 c.c./min |
| Percent yield of HCN (based on NH₃ used) | 37.7% | 65.6% | 17.2% | 28.3% |

In Runs A and B the optimum amount of hydrocarbon gas was used; that is, the rate of flow of the hydrocarbon was varied until optimum yield of HCN was obtained. In Runs C and D, where the platinum-palladium and rhodium catalysts were used, no attempt was made to adjust the rate of flow of hydrocarbon gas to the optimum.

Example 8

Ammonia was oxidized with an excess of air as in Example 7 and the resulting oxidation products were partially cooled, mixed with a stream of the fuel gas described in Example 7 and the mixture passed over a platinum-rhodium alloy wire gauze catalyst. The catalyst mass consisted of a disc made of three layers of 80-mesh wire gauze made of a platinum-rhodium alloy containing 90% of platinum and 10% of rhodium. This catalyst disc was mounted in a silica tube about 16 millimeters inside diameter. The data and results obtained are tabulated below:

| | |
|---|---|
| Reaction temperature | 1000° C. |
| Ammonia | 500 c.c./min. |
| Air | 5000 c.c./min. |
| Fuel gas | 1400 c.c./min. |
| HCN yield (based on NH₃ used) | 40.3% |

Example 9

Ammonia was oxidized as in Example 7 and the oxidation products were partially cooled, mixed with vapors of a hydrocarbon, and the mixture passed over a supported platinum catalyst at a temperature of around 1100° C. The catalyst support was made by precipitating separately silica gel and alumina gel, mixing the gels in equal parts by weight and drying and igniting the mixture. The resulting porous, solid "gel" was impregnated with substantially pure platinum in the usual manner. The data and results are tabulated below for separate runs in which butane and propane respectively were used as the hydrocarbon.

| | Butane | Propane |
|---|---|---|
| Reaction temperature | 1100° C | 1095° C. |
| Ammonia | 100 c.c./min | 300 c.c./min. |
| Air | 1000 c.c./min | 3000 c.c./min. |
| Hydrocarbon vapor | 75 c.c./min | 300 c.c./min. |
| HCN yield (based on NH₃ used) | 53.4% | 40.5% |

In reacting nitric oxide with hydrocarbon in accordance with my invention, I prefer to have substantial quantities of oxygen in the reaction mixture. The use of oxygen in the reaction mixture permits the employment of lower preheating temperatures and causes faster initial reaction, with resulting better yields. However, as shown by the above examples, good yields of hydrocyanic acid may be obtained when oxygen is omitted. Furthermore, in carrying out my invention by the two-stage method, that is, by first oxidizing ammonia and then reacting the oxidation products with hydrocarbon, it is preferable to use an excess of air to oxidize the ammonia in order to obtain the maximum conversion of ammonia to nitric oxide. In carrying out the two-stage process I prefer to use from 8 to 10 volumes of air to 1 volume of ammonia; however, my invention is not restricted to these proportions. In carrying out the process in a single stage, or when employing nitric oxide obtained from a source other than the oxidation of ammonia, I prefer to use an amount of oxygen equivalent to that produced by oxidizing ammonia with 8 to 10 volumes of air. As shown by the above examples, the proportions of the gases other than nitric oxide and hydrocarbon may be varied over wide ranges without substantially affecting the yield of hydrocyanic acid, provided that the proper proportion of hydrocarbon gas is present in the reaction mixture. For any given mixture of nitric oxide and the auxiliary gases, that is, oxides of carbon, oxygen, water vapor, nitrogen, or other inert gas, an optimum amount of hydrocarbon must be used in order to obtain the optimum yield at a given reaction temperature. Such optimum proportion of hydrocarbon may easily be determined by adjusting the rate of flow of hydrocarbon into the reaction system until the optimum yield of hydrocyanic acid is obtained. I prefer to operate with a high ratio of the auxiliary gases to the reactant gases, that is, nitric oxide and hydrocarbon, in the reaction mixture, for example, from 2 to 7 volumes of auxiliary gases to 1 volume of the reactant gases. My invention, however, is not restricted to these proportions. Somewhat lower proportions of the auxiliary gases, for example, may be used; but if the proportion of auxiliary gases becomes too low, there is a tendency to develop excessive temperatures and for carbon to form in the reaction chamber. On the other hand, if the proportion of auxiliary gases is too great, the reaction mixture is thereby diluted to such extent that the required reaction temperature is made more difficult to maintain and recovery of product more difficult.

The yield of hydrocyanic acid will vary depending upon the amount of hydrocarbon gas used, as explained above. Ordinarily the hydrocarbon gas is used in excess of that required theoretically to react with the nitric oxide in the reaction mixture. My invention is not restricted to any particular hydrocarbon or hydrocarbon mixture; methane, acetylene, ethylene, ethane, butane, etc. may be used. The various industrial gases containing hydrocarbons are suitable for carrying out my invention, for example, natural gas, coke oven gas or various types of illuminating and fuel gases. If desired, vapors of liquid hydrocarbons may be used.

The various metals of the platinum group and their alloys are suitable for reacting nitric oxide with hydrocarbon in accordance with my invention. I prefer to use an alloy of platinum and rhodium containing about 10% to 20% of rhodium, although good yields are obtainable with other proportions. I also prefer to use the platinum metal or alloy catalysts in a supported state, that is, supported in a finely divided state on some inorganic, heat resistant material such as asbestos, silica or the like. A suitable supported catalyst may be made by reducing platinum compounds or a mixture of a platinum compound and, for example, a rhodium compound, on the supporting material by the usual methods for making metallic supported catalysts.

The advantages residing in my herein described improved method of producing hydrocyanic acid by reacting nitric oxide with hydrocarbons include conservation of heat, improved temperature control, prevention of carbon deposition and improved yield of product. These advantages are realized especially when my process is operated in the preferred manner, namely in two stages: (1) oxidation of ammonia with air and (2) reaction of the partially cooled ammonia oxidation products with hydrocarbon in the presence of a platinum metal catalyst. This method affords maximum heat conservation. The heat extracted in partially cooling the ammonia oxidation products may be utilized to preheat the incoming ammonia and/or air. The remainder of the sensible heat of the oxidation products is utilized in bringing the second-stage reaction mixture to the temperature required to initiate the catalytic reaction between nitric oxide and hydrocarbon. By regulating the aforesaid cooling in relation to the amount of hydrocarbon added, the initial temperature of the second stage reaction mixture may be accurately controlled. The auxiliary gases which comprise the gases other than nitric oxide in the ammonia oxidation products serve as heat ballast or a heat reservoir, due to their respective heat capacities and thus materially aid in controlling the second stage reaction temperature. If an excess of air is used to oxidize the ammonia in the first stage, the resulting second-stage reaction mixture contains large amounts of nitrogen which serves as heat ballast and also appreciable amounts of oxygen. As pointed out hereinbefore, the presence of oxygen is a distinct advantage in that it permits the second-stage reaction to be carried out at lower temperatures. Also, the second-stage reaction mixture initially contains water vapor in an amount equivalent to the ammonia oxidized in the first stage; this aids in preventing carbon deposition. Thus, with a properly heat-insulated system, the two-stage process may be carried out in a substantially adiabatic manner, or at least without application of heat from sources without the system, with efficient temperature control to produce high yields of hydrocyanic acid.

I claim:—

1. A process for the production of hydrocyanic acid which comprises reacting a mixture initially containing nitric oxide, a gaseous hydrocarbon, water vapor, oxygen and nitrogen in the presence of a platinum-rhodium catalyst.

2. A process for the production of hydrocyanic acid which comprises reacting a mixture initially containing nitric oxide, methane, water vapor, oxygen and nitrogen at a temperature of 1000° C. to 1400° C. in the presence of a supported platinum-rhodium catalyst containing around 10% of rhodium.

3. A process for the production of hydrocyanic acid which comprises reacting a mixture initially containing nitric oxide, methane, water vapor, oxygen and nitrogen in the presence of a platinum-rhodium catalyst at a temperature of about 1000° C. to 1400° C., the sum of the volumes of nitric oxide and methane forming about one eighth to one third of the total volume of the initial reaction mixture and the initial volume ratio of methane to nitric oxide in said reaction mixture being about 1:1 to 2:1.

4. A process for the production of hydrocyanic acid which comprises directly reacting a hot mixture of gases obtained by oxidizing ammonia with an excess of air with a hydrocarbon at a temperature of about 800° C. to 1400° C. in the presence of a supported platinum-rhodium catalyst containing around 10 to 20% of rhodium.

5. A process for the production of hydrocyanic acid which comprises oxidizing ammonia with an excess of air, partially cooling the resulting gas mixture and immediately thereafter reacting said mixture with a hydrocarbon in the presence of a platinum alloy catalyst at a temperature of about 800° C. to 1400° C., the above mentioned step of partial cooling being so carried out that the gas mixture, after the addition of said hydrocarbon thereto, is maintained at a temperature not lower than about 600° C.

6. A process for the production of hydrocyanic acid which comprises oxidizing ammonia by reacting one volume of ammonia with 8 to 10 volumes of air in the presence of an ammonia oxidation catalyst and directly reacting the resulting hot gas mixture with a hydrocarbon in the presence of a platinum-rhodium catalyst at a temperature of about 800° C. to 1400° C.

7. A process for the production of hydrocyanic acid which comprises oxidizing ammonia by reacting one volume of ammonia with 8 to 10 volumes of air in the presence of an ammonia oxidation catalyst, partially cooling the resulting hot gas mixture and immediately thereafter reacting said mixture with methane at a temperature of about 1000° C. to 1200° C. in the presence of a supported platinum-rhodium catalyst containing around 10% of rhodium, the above mentioned step of partial cooling being so carried out that the gas mixture, after the addition of the methane is maintained at a temperature not lower than about 600° C.

8. A process for the production of hydrocyanic acid which comprises oxidizing ammonia with air in the presence of an ammonia oxidation catalyst and directly passing the resulting hot gas mixture together with a hydrocarbon in the vapor phase over a platinum metal catalyst.

9. A process for the production of hydrocyanic acid which comprises oxidizing ammonia with an excess of air to obtain a hot gaseous mixture of nitric oxide, water vapor, oxygen and nitrogen, cooling said hot gaseous mixture and mixing therewith a hydrocarbon vapor in excess in such manner that the resulting hydrocarbon-containing mixture is at a temperature not lower than about 600° C. and reacting said resulting mixture in the presence of a platinum metal catalyst.

BURRITT S. LACY.